(12) United States Patent
Kisters

(10) Patent No.: US 8,931,079 B2
(45) Date of Patent: Jan. 6, 2015

(54) SECURITY ELEMENT HAVING AN ELECTRONIC DISPLAY DEVICE FOR DISPLAYING SECURITY-RELEVANT INFORMATION OR PATTERNS

(75) Inventor: Friedrich Kisters, Kreuzlingen (CH)

(73) Assignee: Friedrich Kisters, Kreuzlingen (CH)

( * ) Notice: Subject to any disclaimer, the term of this patent is extended or adjusted under 35 U.S.C. 154(b) by 0 days.

(21) Appl. No.: 13/368,497

(22) Filed: Feb. 8, 2012

(65) Prior Publication Data

US 2012/0210418 A1 Aug. 16, 2012

Related U.S. Application Data

(63) Continuation of application No. PCT/EP2010/004653, filed on Jul. 29, 2010.

(30) Foreign Application Priority Data

Aug. 8, 2009 (DE) .......................... 10 2009 036 706

(51) Int. Cl.
*H04L 29/06* (2006.01)
*G06F 3/147* (2006.01)

(52) U.S. Cl.
CPC ............ *G06F 3/147* (2013.01); *H04L 63/0492* (2013.01)
USPC .............................................. 726/16; 726/27

(58) Field of Classification Search
CPC ................................................. H04L 63/0492
USPC ............................................................ 726/16
See application file for complete search history.

(56) References Cited

U.S. PATENT DOCUMENTS

| | | | | |
|---|---|---|---|---|
| 7,036,650 B2 * | 5/2006 | Brugger et al. | ............... | 194/206 |
| 2003/0067395 A1 | 4/2003 | Hall et al. | | |
| 2004/0245066 A1 * | 12/2004 | Ichikawa et al. | ............... | 194/206 |
| 2007/0229263 A1 * | 10/2007 | Staub et al. | ................ | 340/572.1 |
| 2007/0250923 A1 | 10/2007 | M'Raihi | | |
| 2009/0074229 A1 * | 3/2009 | Giering et al. | ................ | 382/100 |
| 2009/0303044 A1 * | 12/2009 | Furuichi et al. | ............ | 340/568.1 |

FOREIGN PATENT DOCUMENTS

| | | |
|---|---|---|
| DE | 10 2004 045 211 A1 | 3/2006 |
| DE | 10 2004 049 998 A1 | 4/2006 |
| DE | 10 2005 030 626 A1 | 1/2007 |
| EP | 0 566 811 A1 | 10/1993 |
| WO | WO 2007/145540 A2 | 12/2007 |
| WO | WO 2009/094043 A1 | 7/2009 |

* cited by examiner

*Primary Examiner* — Hadi Armouche
*Assistant Examiner* — Dao Ho
(74) *Attorney, Agent, or Firm* — Muncy, Geissler, Olds & Lowe, P.C.

(57) ABSTRACT

A security element having an electronic display device, particularly a digital display for representing security-relevant information or patterns is provided, wherein the represented information or patterns changes or change over time due to an algorithm and/or external influences. A method for marking, identifying or authenticating objects or living beings is provide, with the living being or object being provided with a security element having an electronic display device, particularly a digital display for representing security-relevant information or patterns, whereby the represented information or patterns changes or change over time due to an algorithm and/or external influences.

22 Claims, 2 Drawing Sheets

SECURITY ELEMENT HAVING AN ELECTRONIC DISPLAY DEVICE FOR DISPLAYING SECURITY-RELEVANT INFORMATION OR PATTERNS

This nonprovisional application is a continuation of International Application No. PCT/EP2010/004653, which was filed on Jul. 29, 2010, and which claims priority to German Patent Application No. DE 10 2009 036 706.3, which was filed in Germany on Aug. 8, 2009, and which are both herein incorporated by reference.

BACKGROUND OF THE INVENTION

1. Field of the Invention

The present invention relates to a security element having an electronic display device, in particular a digital display for displaying security-relevant information or patterns. Furthermore, the present invention relates to a method for marking, identifying or authenticating objects or living beings in which the object or living being is equipped with a security element with an electronic display device, in particular a digital display for displaying security-relevant information or patterns, wherein the information or patterns shown change based on an algorithm and/or external influences.

2. Description of the Background Art

Current security elements or security systems always still exhibit defects with respect to anti-forgery protection or the prevention of abuse. Security features are identified by the forgers and copied as close to the original as possible. Even objects such as IDS, documents or access cards, which have several different types of security features (e.g., holographic signs, watermarks, information stored on magnetic tape, color codes, etc.) can be reproduced and thus faithfully rendered.

A way of making such security features secure against forgery lies in making them appear invisible to the forger. However, this type of system functions well only as long as the forger has no knowledge of rendering visible or evaluation and the actually authorized bearer is in possession of the object marked or equipped with the security element. If, for example, the ID or the access card is stolen, the holder thereof, although he is not authorized, can identify himself and possibly gain access to restricted areas. The problem of the security elements known in the prior art lies in the fact that they are too rigid and are not flexible enough with respect to their security features. Reference is made, by way of example, in this context to DE 10 2004 045 211 A1. A security document is described therein with electrically controlled display element for generating an optical security feature with an associated electrical current source. The display element has an organic light-emitting diode, for example, which is shaped in the form of a pattern or a number. The display element thus provides a light-emitting structure on a certain wavelength. The display element can furthermore be embodied in the form of a pattern or a number in an electrochromic manner. The structure shown on the display element is dependent on the applied electric voltage. In the event of theft or loss, the bearer can also authorize himself by means of documents or objects marked with a display element of this type in a system-secure manner. This is unsatisfactory.

Another display system in a security document is described in DE 10 2005 030 626 A1. The security document has an integrated circuit for communication with an external read and/or write device and at least one display system integrated into the security document. This is designed to provide a self-personalizing document. After the personalization, the display system contains person-specific and/or document-specific data, in particular the name and/or biometric data of the document holder or the validity period of the document, and in addition preferably comprises one or more security elements, which are likewise integrated into the security document. A security document of this type is also rigid with its security features and does not avoid an unauthorized bearer being able to gain access to certain areas or even being able to mark a forgery (e.g., a forged painting or piece of furniture) with a genuine security element true to the original. For example, if an artist has a personalized security element customized for him and if he uses it to indicate the originality of the works of art produced by him, in the event of the loss or theft of this security element, any unauthorized person can pass off a duplicate of a work of art as an original. This is not satisfactory.

DE 10 2004 049 998 A1, which corresponds to US 2009/0074229, and which discloses a device and a method for visually representing measuring values. The visual representation of authenticity data or other measuring values is hereby veiled by visually representing not the measuring values themselves, but camouflage data, which are formed by measuring values changed with the aid of a mathematical algorithm.

SUMMARY OF THE INVENTION

It is therefore an object of the present invention to disclose a security element, with which a distinct marking, identification or authentication of an object or a living being is possible even in the event of loss or theft and which is flexible, and not rigid, with respect to the security features shown.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
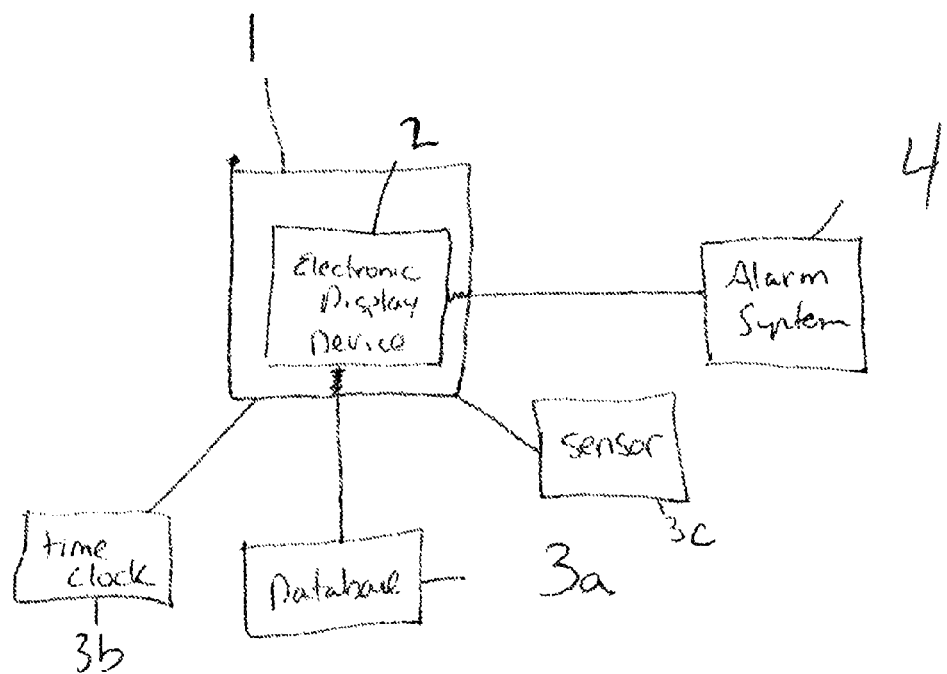
FIG. 1 is a diagram of the security system.

As shown in FIG. 1, the security element 1 according to an embodiment of the invention is equipped with an electronic display device 2. This preferably corresponds to a digital display (e.g., LCD display, TFT display), with which security-relevant information or patterns can be shown. The core of the invention lies in that the security-relevant information or patterns shown can be changed based on an algorithm and/or external influences.

The algorithm can be predetermined and based on a personalizing calculation model. An additional anti-forgery protection and anti-fraud protection is achieved by only the authorized person knowing the key for the algorithm.

The information shown in the display device 2 is composed of letters, numbers, patterns and/or color codes. One or more letters, numbers, patterns and/or color codes can thereby be shown alone or in combination with one another. The display of individual letters, numbers or complete lettering in one or different colors can also have an informative content. Due to the change of the information, the forger does not know which information is current or relevant. The deceiver does not know either whether and which information or patterns have been changed. Only the actually authorized person is in possession of the valid information or patterns and can carry out a test for authenticity, for example, using a suitable test device, optionally with the respective activation of the digital display, based on the respective security feature (e.g., password or voice).

The pattern shown in the display device 2 is preferably a random pattern, preferably a crackle finish pattern in the form of random cracks or fissures, chips or shrinkage. However, the pattern can also be a picture, a graphic or a color representation or a color combination. There are no limits to the imagination here. Depending on the case of use, the type and the style of the pattern or of the information displayed can vary. In order to achieve a high degree of anti-forgery protection, the information shown or, even better, the pattern shown should be random, if possible. It is not sufficient to rely on a specific logic or a specific system, in order to prevent abuse.

In a further variant, it is not just the visual display, but also the display 2 itself that can develop a crackle finish or even break or tear, so that the display 2 is changed based on these influences. The change can lead to "dead" points in the display, which expand like chips in the event of further changes or can "heal" again. The changes in the display 2 itself can be formed in a planned, that is, material-related, manner, or in a random manner, for example, due to external influences such as humidity, temperature, impact damage or wear. In this respect, all surface features (deliberate and random) can be used as further security features for individualizing the security element.

In this respect, it is provided in an embodiment that the digital display 2 itself physically changes, in that it becomes cracked or brittle itself and these changes per se and in their influence on the visual display of the display 2 are also evaluated in a test, wherein these changes turn out individually and/or in a group-specific manner and can be considered accordingly. The display 2 can even be constructed in layers and change accordingly. Each layer can contain security features or cover other layers such that their security features are discernible only with certain methods.

The above-mentioned external influences preferably comprise an update of the information or patterns shown via a database 3a, a time clock-controlled change 3b or a sensor-communicated change 3c (see FIG. 1).

In the event of an update via a database 3a, new data for representing changed information or a pattern are transmitted to the display device 2. The transmission can take place at a specific time or in a random manner.

A time clock-controlled change applies when the information or patterns change depending on a specific time or are repeated at a specific time. For example, the display device 2 can have a green color display at a predetermined time, which is valid only for one hour, however. Thus a service technician could have access to a controlled area for a specific length of time. However, the color can also change second by second, either at random or according to a predetermined algorithm. This creates a further security feature that is secure against forgery, since the random or algorithm-controlled change cannot be foreseen or reproduced by the forger or deceiver.

The sensor-communicated change can be composed of changes that take place via heat, humidity, pressure, odor, motion, sound, acoustic or light sensors. The change of the information or patterns shown in the display device 2 takes place, for example, with a change in temperature, air pressure, air humidity or in the event of changes in the light intensity (lux). In this manner, for example, an object (e.g. a work of art) deposited in a room can be prevented from being removed from the room in an unauthorized manner. The display device 2 can hereby be connected to an alarm system 4 (see FIG. 1) so that an alarm is triggered in the event of changes in the security-relevant information or patterns due to the above-referenced influences.

The display device 2 according to the invention can preferably be connected to an electronic telecommunications device or is part of an electronic telecommunications device, for example, a cell phone, an electronic pocket planner, an organizer, a PDA, a mini PC or a notebook. These are objects that already have a display per se.

However, the display device 2 according to the invention can also be applied to any desired carrier or a film. Special displays can also be used, for example displays with liquid crystals or diode displays. The display device 2 can also be present in textile form or can be woven.

In an embodiment, the information or patterns shown in the display device 2 are subject to time-dependent changes. For example, such changes can be periodic color changes that take place in a random manner or according to an algorithm.

Figure 2:
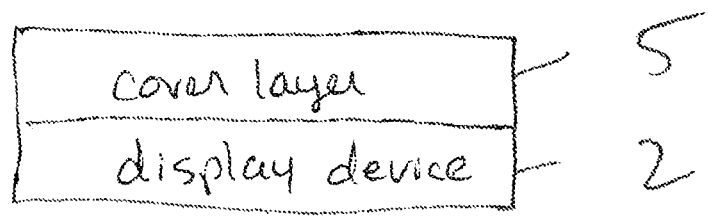
FIG. 2 is a cross-sectional view of the display device have a cover layer.
Figure 3:
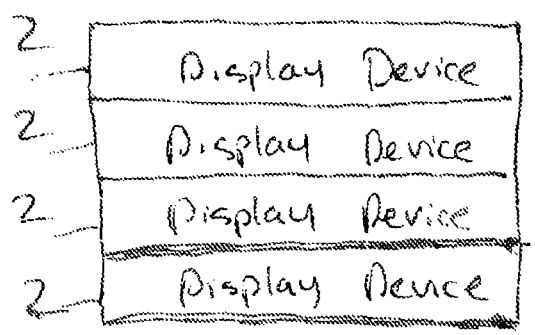
FIG. 3 is a cross-sectional view of a display device having multiple layers of display devices.

In many cases it can be desirable that the unauthorized holder does not immediately recognize the security-relevant information or patterns shown in the display device 2 as such. To this end, as shown in FIG. 2, the display device 2 is preferably covered by a layer 5 that causes the information or patterns appearing in the display device 2 to be visible only with light of a certain wavelength. For example, the layer 5 and the display device 2 can be designed such that the security-relevant information or patterns shown are visible only with infrared light of a certain wavelength. To this end it can be expedient for several display devices 2 to be arranged one above the other, as shown in FIG. 3, wherein only the upper display device 2 is visible to the human eye, while the display device 2 below it is visible only with light of a specific wavelength.

In one variant a display logic can prevent an unauthorized third party from recognizing a code word visible on the display 2 by a plurality of such code words being displayed, which continuously change in color and optionally in appearance. Since only the authorized user knows which color and/or shape the respectively valid code word must have, a high security standard is achieved. Preferably, the color and/or shape are additionally controlled via further parameters, such as, for example, the time of day, the time, light quantity or the type of light in a room.

It is furthermore provided that the security-relevant information or patterns shown in the display device 2 can be switched on or off and optionally are shown superimposed by regular information or patterns that are not security-relevant or next to one another.

With the method according to the invention for marking, identifying or authenticating objects or living beings, an object or living being is equipped with a security element 1 with an electronic display device 2, in particular a digital display for displaying security-relevant information or patterns, wherein the information or patterns shown can be changed based on an algorithm and/or external influences.

It is preferably provided that the validity of the information or patterns shown in the display device 2 of the security element 1 is dependent on the predetermined algorithm and/or external influences. In addition to the security-relevant information or patterns already mentioned, additional security features can also be used for identification, assignment or authentication. According to the invention, these are preferably biometric features, such as, for example, the human voice. Access authorization to a certain area could take place, for example, in a combination of the security element 1 (with its display device 2) with the biometric features. Only when both requirements have been met is the bearer given access to the access-tested area.

The identification, assignment or authentication takes place before the test of the respective activation of the security-relevant information or patterns of the security element 1. The identification, assignment or authentication can take place either at regular intervals for bearer confirmation or upon request.

In order to obtain a highest degree of security, the security-relevant information or patterns shown in the display device 2 are compared with one or more databases 3a periodically or following an algorithm. It is preferably provided thereby that an update of the database 3a contents takes place when a use, scan or test of the information or patterns shown in the display device 2 occurs. Preferably, the data stock is newly updated with each scan or test and the security element 1 is shifted to a new state, as it were. Thus, for example, in the event of a change of holder it can be reset to a new original state. Parts or all of previously present information or patterns thus become invalid.

A new assignment or update of the information or patterns shown in the display 2 can also be started via remote control, for example. The activation codes or start signals are thereby transmitted via methods known per se and the security element 1 thus on standby is started for a new assignment. This can be carried out, for example, by telephone (e.g., by DTMF signals; single-tone or multi-tone signals, SMS, test device or via Remote Access). The validity period or the switch over into standby mode can also be controlled via one of the above-mentioned methods. The new assignment can take place before the test of the respective activation, at regular intervals for bearer confirmation (e.g., in the background with the use of the cell phone) or upon request (SMS, call). Moreover, an approval of the bearer can be necessary by entering one or more security features, for example, a biometric feature.

In one variant of the method according to the invention, the data for showing the security-relevant information or patterns are first transmitted, but the information or patterns are shown on the display device 2 only at a later time. The forger or deceiver does not know when the security-relevant information or patterns will be valid.

In order to increase security, in addition to the security-relevant information or patterns, information or patterns that are not security-relevant can also be shown. It can be provided thereby that only a part of the information or patterns shown on the display device 2 are updated.

As already mentioned, also specific, individual features of the display 2 itself can be used as a security feature in addition to or supplementing the display function. This includes for example surface structures, wear, paint damage, soiling, crack formation (crackle finish), which contributes to the individualization.

The security element 1 according to the invention can either be fully individualized or partially individualized. Thus special embodiments for police officers, paramedics or fire department members, for example, are conceivable. In a preferred embodiment the log of the respective work group is shown on the display.

The digital or non-digital individualization feature can be static or change like the additionally displayed digital or non-digital security features. A code word or other identification feature(s) (invisible to the human eye) can be deposited among them. An assignment via biometric features (such as the human voice, for example) is likewise possible.

One advantage of the method or the security element 1 according to the invention is to be seen in that the individual security features are not rigid, but can be updated at certain times, or following events or an algorithm. The highest degree of anti-forgery protection and abuse protection is provided thereby.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A security device comprising:
   an electronic display device or a digital display for displaying security-relevant information or patterns,
      wherein the electronic display device or the digital display changes only a portion of the displayed security-relevant information or patterns, over time, based on an algorithm and/or external influences,
      wherein when the change over time is based on the external influences, the change over time comprises a change of only the portion of the displayed security-relevant information or patterns via a time controlled change or a sensor communicated change, and
   a database which is updated with the displayed security-relevant information or patterns comprising the change of only the portion of the displayed security-relevant information or patterns, when a use, scan or test of the information or patterns shown in the electronic display device or the digital display occurs,
   wherein the electronic display device or the digital display is connected to an electronic telecommunications device or is part of an electronic telecommunications device.

2. The security device according to claim 1, wherein the security-relevant information shown in the display device is composed of letters, numbers and/or color codes.

3. The security device according to claim 1, wherein the security-relevant pattern shown in the display device is a random pattern or a crackle finish pattern in the form of random cracks or fissures, chips or shrinkage.

4. The security device according to claim 1, wherein the security-relevant pattern shown in the display device is a picture, a graphic or a color representation or a color combination.

5. The security device according to claim 1, wherein the changes are periodic color changes, which take place in a random manner or according to an algorithm.

6. The security device according to claim 1, wherein the display device is covered by a layer that causes the security-relevant information or patterns appearing in the display device to be visible only with light of a certain wavelength.

7. The security device according to claim 1, wherein several display devices are arranged one above the other, and wherein only the upper display device is visible to the human eye, while the display device lying below it is visible only with light of a specific wavelength.

8. The security device according to claim 1, wherein the security-relevant information or patterns shown in the display device can be switched on or off and optionally are shown superimposed by regular information or patterns that are not security-relevant or next to one another.

9. The security device according to claim 1, wherein a physical characteristic of the electronic display device or the digital display itself changes over time due to the external influences, such that a change occurs in both the displayed security-relevant information or patterns and the electronic display device or the digital display itself.

10. The security device according to claim 1, wherein the electronic display device or the digital display is provided on a film.

11. The security device according to claim 1, wherein the sensor-communicated changes take place via heat, humidity, pressure, or light sensors.

12. A method for marking, identifying or authenticating objects or living beings, the method comprising:
   equipping the object or living being with a security device, the security device comprising an electronic display device and/or a digital display for displaying security-relevant information or patterns;
   changing only a portion of the displayed security-relevant information or patterns, over time, based on an algorithm and/or external influences,
      wherein when the change over time is based on the external influences, the change over time comprises changing only the portion of the displayed security-relevant information or patterns via a time controlled change or a sensor communicated change, and
   updating a database with the displayed security-relevant information or patterns comprising the change of only the portion of the displayed security-relevant information or patterns, when a use, scan or test of the information or patterns shown in the electronic display device and/or digital display occurs,
      wherein the electronic display device and/or digital display is connected to an electronic telecommunications device or is part of an electronic telecommunications device.

13. The method according to claim 12, wherein the security-relevant information shown in the display device is composed of letters, numbers and/or color codes.

14. The method according to claim 12, wherein a validity of the security-relevant information or patterns shown in the display device of the security device is dependent on the predetermined algorithm and/or external influences.

15. The method according to claim 12, wherein the identification, assignment or authentication additionally takes place via biometric features.

16. The method according to claim 12, wherein the identification, assignment or authentication takes place before the test of the respective activation of the security-relevant information or patterns.

17. The method according to claim 12, wherein the identification, assignment or authentication takes place at regular intervals for bearer confirmation.

18. The method according to claim 12, wherein the identification, assignment or authentication takes place upon request.

19. The method according to claim 12, wherein the data for showing the security-relevant information or patterns are first transmitted, but the information or patterns are shown on the display device only at a predetermined time.

20. The method according to claim 12, wherein, in addition to the security-relevant information or patterns, information or patterns that are not security-relevant are also shown.

21. The method according to claim 12, wherein a physical characteristic of the electronic display device or the digital display itself changes over time due to the external influences, such that a change occurs in both the displayed security-relevant information or patterns and the electronic display device or the digital display itself.

22. The method according to claim 12, wherein the electronic display device or the digital display is provided on a film.

* * * * *